(12) United States Patent
Kastyshyn et al.

(10) Patent No.: US 10,802,950 B2
(45) Date of Patent: Oct. 13, 2020

(54) AUTOMATED WEBPAGE TESTING

(71) Applicant: ServiceNow, Inc., Santa Clara, CA (US)

(72) Inventors: Hendazi Kastyshyn, Walnut Creek, CA (US); Anson Barber Mayers, San Rafael, CA (US); Joel Rorik Fischer, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/375,527

(22) Filed: Apr. 4, 2019

(65) Prior Publication Data

US 2020/0089597 A1    Mar. 19, 2020

Related U.S. Application Data

(60) Provisional application No. 62/733,436, filed on Sep. 19, 2018.

(51) Int. Cl.
 *G06F 11/36* (2006.01)
 *G06F 16/958* (2019.01)
(52) U.S. Cl.
 CPC ...... *G06F 11/3664* (2013.01); *G06F 11/3688* (2013.01); *G06F 16/958* (2019.01)
(58) Field of Classification Search
 CPC . G06F 11/3688; G06F 11/3664; G06F 16/958
 USPC .................................................. 717/100–135
 See application file for complete search history.

(56) References Cited

U.S. PATENT DOCUMENTS

| | | | | |
|---|---|---|---|---|
| 6,185,701 | B1* | 2/2001 | Marullo | G06F 16/958 |
| | | | | 714/38.14 |
| 6,620,204 | B1* | 9/2003 | Malcolm | G06F 11/3664 |
| | | | | 714/38.11 |
| 6,678,887 | B1 | 1/2004 | Hallman | |
| 7,099,893 | B2* | 8/2006 | Bischof | G06F 11/3688 |
| | | | | 707/737 |
| 8,196,112 | B1* | 6/2012 | Cansizlar | G06F 16/9577 |
| | | | | 717/126 |
| 8,312,436 | B2* | 11/2012 | Barry | G06F 11/3688 |
| | | | | 717/135 |
| 8,365,069 | B1* | 1/2013 | Haubrich | G06F 16/958 |
| | | | | 715/234 |
| 8,433,733 | B2* | 4/2013 | Sayed | G06F 9/542 |
| | | | | 707/821 |

(Continued)

*Primary Examiner* — Marina Lee
(74) *Attorney, Agent, or Firm* — Fletcher Yoder PC

(57) ABSTRACT

Systems and methods involving automated test of web pages are described. A computing device may load a web page in a test environment, the web page may having a first underlying representation for rendering. The underlying representation may be analyzed by a page crawler to identify one or more testable components of the web page. A file may be generated, and the identified components may be stored in the file in a second representation that may be more streamlined than the first. The testable components in the file may be displayed as a menu of selectable test options in a graphical user interface (GUI) on a display device. Selection of at least one of the selectable test options may be made via input received at the GUI, the selections corresponding to a set of test steps. The set of test steps may be run in the test environment.

23 Claims, 13 Drawing Sheets

(56) References Cited

U.S. PATENT DOCUMENTS

| | | | | |
|---|---|---|---|---|
| 8,650,493 | B2* | 2/2014 | Miller | H04L 69/329 |
| | | | | 715/738 |
| 8,689,189 | B1* | 4/2014 | Cansizlar | G06F 16/9577 |
| | | | | 717/126 |
| 8,799,866 | B2* | 8/2014 | Bullard | G06F 3/048 |
| | | | | 717/125 |
| 9,507,700 | B1* | 11/2016 | Vignet | G06F 11/3688 |
| 9,557,969 | B2 | 1/2017 | Sharma | |
| 2008/0222284 | A1* | 9/2008 | Barua | G06F 16/958 |
| | | | | 709/224 |
| 2012/0311471 | A1* | 12/2012 | Bullard | G06F 30/00 |
| | | | | 715/765 |
| 2012/0311541 | A1* | 12/2012 | Bullard | G06F 11/368 |
| | | | | 717/127 |
| 2015/0227533 | A1* | 8/2015 | Goldstein | G06F 16/2379 |
| | | | | 707/661 |
| 2018/0316757 | A1* | 11/2018 | Tucker | H04L 67/1095 |
| 2020/0089597 | A1* | 3/2020 | Kastyshyn | G06F 11/3688 |

\* cited by examiner

JSON FILE 700

```
[{
"tag" : "button"
"methods" : ["click"],
"area" : "default",        ← 602
"id": "toggleMoreOptions",
"index": 0,
"inner_text": "More Options"
"hash": "a00dfx31C"
}, {
"tag" : "div"
"methods" : ["set"],
"area" : "secondary",
"id": "comments",          ← 604
"index": 0,
"inner_text": "",
"hash": "d4b092e2v"
},{

.
    .
    .
    .

},{
"tag" : "span"
"methods" : ["set"],
"area" : "secondary",
"id": "comment_box",       ← 606
"index": 0,
"inner_text": "Your Comment",
"hash": "090iu2pj9"
},{
"tag" : "button"
"methods" : ["click"],
"area" : "secondary",
"id": "submit_comment",
"index": 1,                ← 608
"inner_text": "submit"
"hash": "x05d6x0e3"
}]
```

610 → points to "area" : "default" (602)

612 → points to "area" : "secondary" (in 608 block)

AUTOMATED WEBPAGE TESTING

CROSS-REFERENCE TO RELATED APPLICATIONS

This application claims priority under 35 U.S.C. § 119(e) to U.S. Provisional Patent Application Ser. No. 62/733,436, filed on Sep. 19, 2018, which is incorporated herein in its entirety by reference.

BACKGROUND

Managed networks may include various types of computer networks that can be remotely administered. This management may involve one or more computing devices disposed within a remote network management platform for hosting various services and operations. The remote network management platform may take the form of a hosted environment that provides application Platform-as-a-Service (aPaaS) services to users, particularly to operators of the managed network, such as enterprises and/or organizations. Such services may take the form of web-based portals and/or software applications that enterprises, and both internal and external users thereof, may access through one or another form of deployment of the remote network management platform.

SUMMARY

A remote management platform may be provided by a third party, such as a service provider or vendor. For example, a remote network management platform may be owned and operated by a service provider or vendor that, in turn, sells network management services to customers, such as enterprises and/or organization, on a subscription or other cost basis. Customers may then be provided with their own respective "computational instances" of a remote network management system for managing their respective networks.

Each computational instance of a common remote network management platform may implement individualized network management for particular customers or organizations using a mix of physical and/or virtual components. Operationally, a computational instance may make a set of web portals, services, and applications available to a particular customer. Both common and distinct infrastructure components, such as servers, databases, and software may be configured in an architecture that provides multiple computational instances for serving multiple customers or organizations.

An enterprise or other entity can use a computational instance to access various web-based resources (e.g., web pages) provided by the remote network management platform, as well as other services. In an example deployment, a service provider or vendor may own and/or operate a common remote network management platform that includes multiple computational instances, each associated with, and supporting network management services for, a distinct enterprise, organization, or customer. At the level of an end user of an enterprise or organization, web-based resources may support mission-specific services or tasks, for example. A customer may thus employ (or contract) its own personnel to manage its network utilizing its respective instance of the remote network management system.

A service provider or vendor that owns and operates a remote network management platform may further control and/or be responsible for building and maintaining the platform. This may entail design, development, and deployment of the various components that make up the platform, and that implement the computational instances and services provided by and within them. It may further entail maintaining and upgrading the platform and the computational instances, for example, fixing problems and developing and releasing new services, features, and/or applications for customers.

In carrying out the activities involved in design, development, deployment, maintenance, and upgrading a remote network management platform, the owner/operator of the platform (e.g., service provider or vendor) may employ developers with specific expertise, and utilize customized development tools and development environments, along with industry-standard tools. For example, developers may have particular expertise in areas of advanced web portal and web page design and development, database design and implementation, and server and service application design and deployment, among others. And developers may utilize (and possibly design and develop) specialized tools and environments for implementing and testing new features, functions and services. Such tools may include customized or specialized application programming interfaces (APIs) for connecting interactive web page features with a testing environment, in order to facilitate testing of new or upgraded web pages.

A remote network management platform may also allow and/or enable customers to develop their own custom and/or specialized web pages within their respective computational instances. Such a capability may thus allow customers to develop and implement end-user services and features aimed at their particular needs, for example. It may also be possible for customers to modify certain aspects of web pages provided by the service provider or vendor.

However, in contrast with the owner/operator of the remote network management platform, a customer may not necessarily employ web-page developers with the same high level of expertise. For example, a customer's needs for custom web page development may be accommodated with off-the-shelf development tools and environments geared toward simplifying development steps and tasks, so as to make them available to personnel with possibly limited development experience. At the same time, customized or specialized development tools and testing environments used by the owner/operator of the remote network management platform may not be available to its customers, even for those that employ expert developers. In particular, the unavailability of customized testing APIs to interactive and/or operational features of web pages can hamper a customer's ability to test and validate new or modified web pages, particularly when those features are designed to involve or invoke communication with servers and/or services implemented by the owner/operator of the remote network management platform. It would therefore be desirable to overcome this limitation.

Example embodiments disclosed herein are aimed at addressing shortcomings of web page development and testing when testing APIs to interactive and/or operational features or aspects of web pages are lacking or unavailable. In particular, example embodiments introduce techniques for analyzing the textual/functional representation of a web page used for rendering the web page, in order to discover and identify interactive/operational features. The results of this process may then be used to facilitate test design and execution applied to the web page as rendered. Advantageously, a facility for providing such analysis of the textual/functional representation of a web page used for rendering the web page, which is referred to herein as a "page inspector," may enable a page author to validate the testability of a web page in real time using an API by interacting with the page components through the API.

Accordingly, a first example embodiment may involve computing device comprising: a processor; a display component; and memory storing instructions that when executed by the processor cause the computing device to carry out operations including: loading a web page into a test environment, the web page having an underlying first representation for rendering of the web page; analyzing the underlying first representation to identify testable components each corresponding to an element associated with interactive content on the web page; generating a file containing the identified testable component, the generated file having a second representation different than the underlying first representation; on the display component, displaying in a graphical user interface the identified testable components in the file as a menu of selectable test options; receiving input via the graphical user interface indicative of a selection of at least one of the selectable test options; generating from the input a set of test steps; and running the set of test steps in the test environment.

A second example embodiment may involve method carried out in a computing device, the method comprising: loading a web page into a test environment executing on computing device, the web page having an underlying first representation for rendering of the web page; analyzing the underlying first representation to identify testable components each corresponding to an element associated with interactive content on the web page, generating a file containing the identified testable component, the generated file having a second representation different than the underlying first representation; displaying in a graphical user interface of the computing device the identified testable components in the file as a menu of selectable test options; receiving input via the graphical user interface indicative of a selection of at least one of the selectable test options; generating from the input a set of test steps; and running the set of test steps in the test environment.

A third example embodiment may involve an article of manufacture including a non-transitory computer-readable medium, having stored thereon program instructions that, upon execution by a computing device, cause the computing system to perform operations comprising: loading a web page into a test environment executing on computing device, the web page having an underlying first representation for rendering of the web page; analyzing the underlying first representation to identify testable components each corresponding to an element associated with interactive content on the web page; generating a file containing the identified testable component, the generated file having a second representation different than the underlying first representation; displaying in a graphical user interface of the computing device the identified testable components in the file as a menu of selectable test options; receiving input via the graphical user interface indicative of a selection of at least one of the selectable test options; generating from the input a set of test steps; and running the set of test steps in the test environment.

In a fourth example embodiment, a system may include various means for carrying out each of the operations of the second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts an example file format for storing results of analysis of a web page, in accordance with example embodiments.

FIG. 8A depicts a version of an example graphical user interface (GUI) for test development, in accordance with example embodiments.

FIG. 8B depicts another version of an example graphical user interface (GUI) for test development, in accordance with example embodiments.

DETAILED DESCRIPTION

Figure 1:
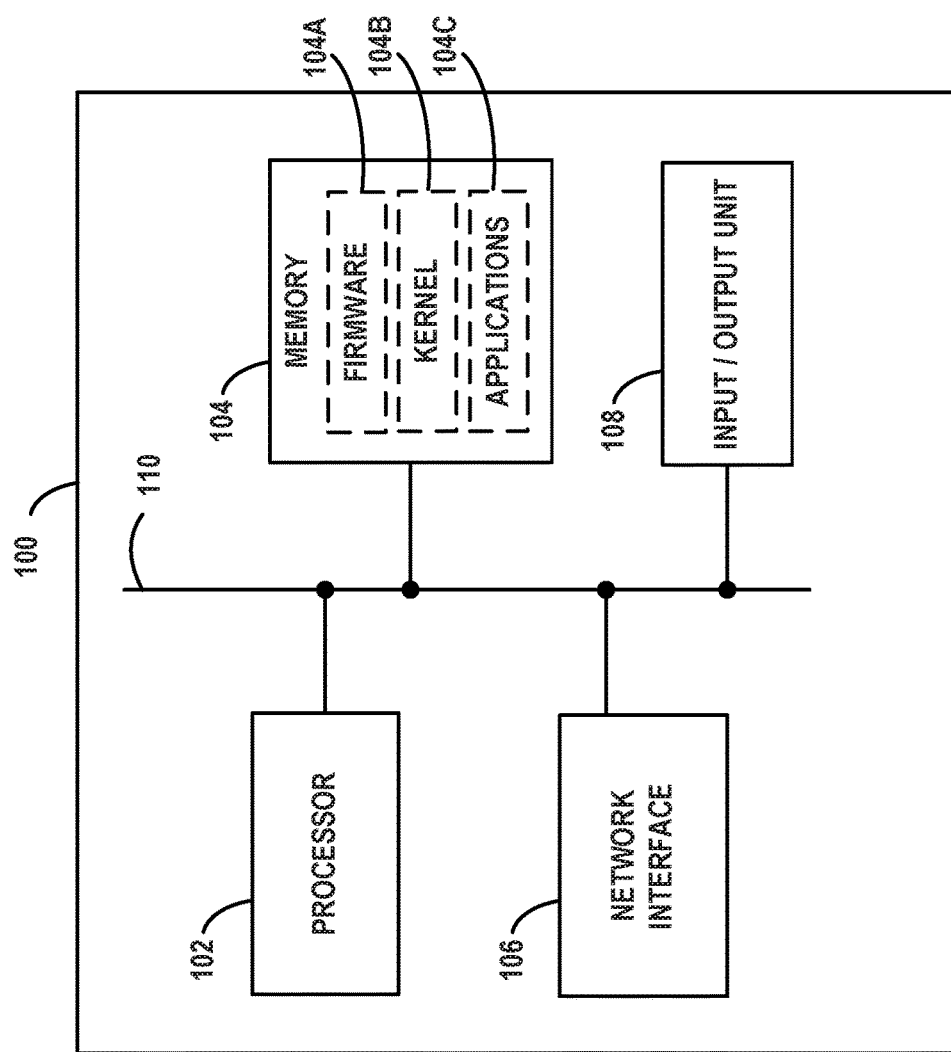
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
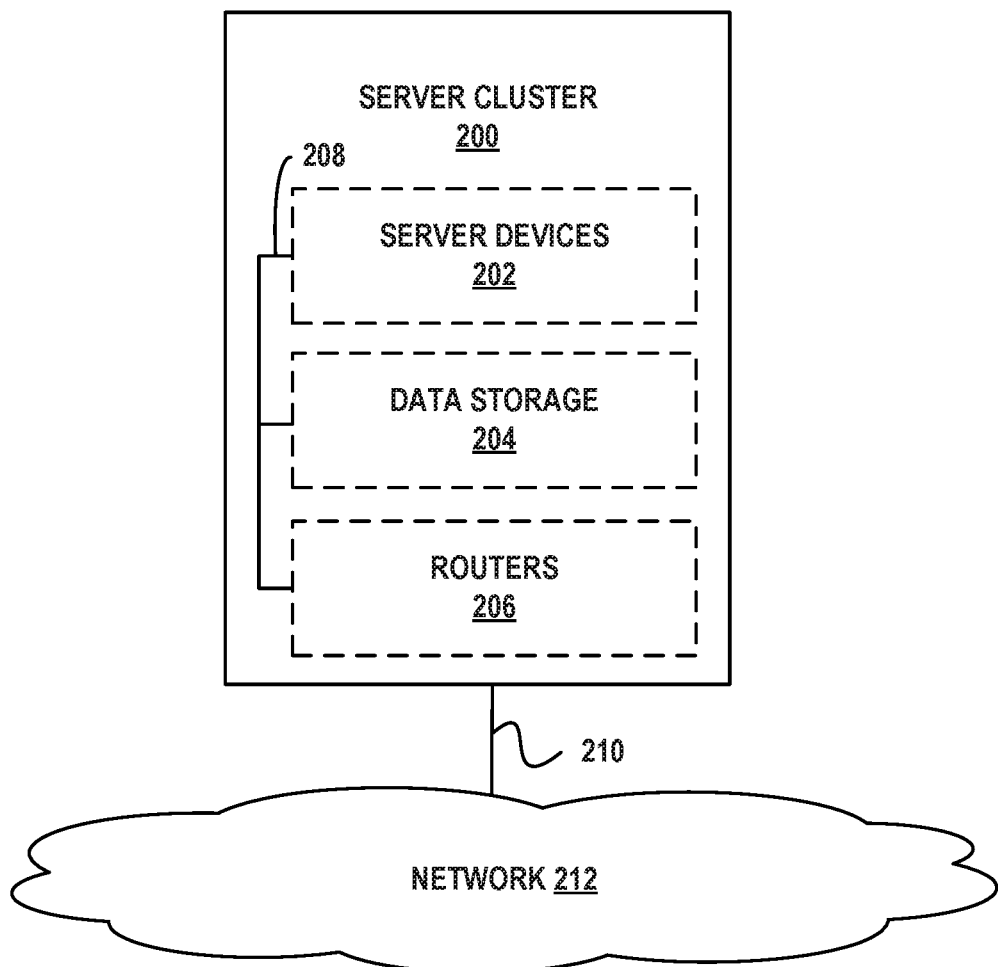
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
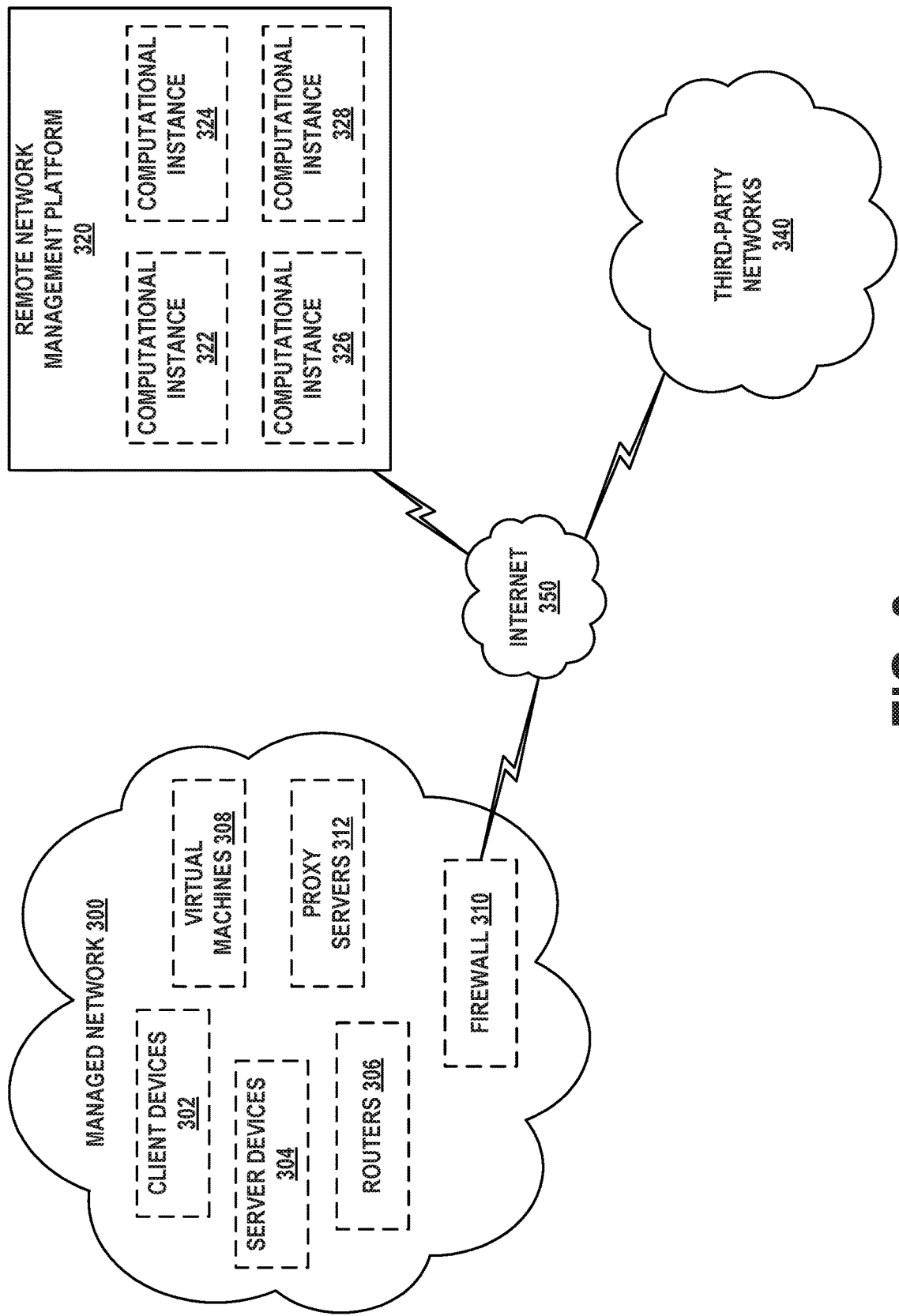
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
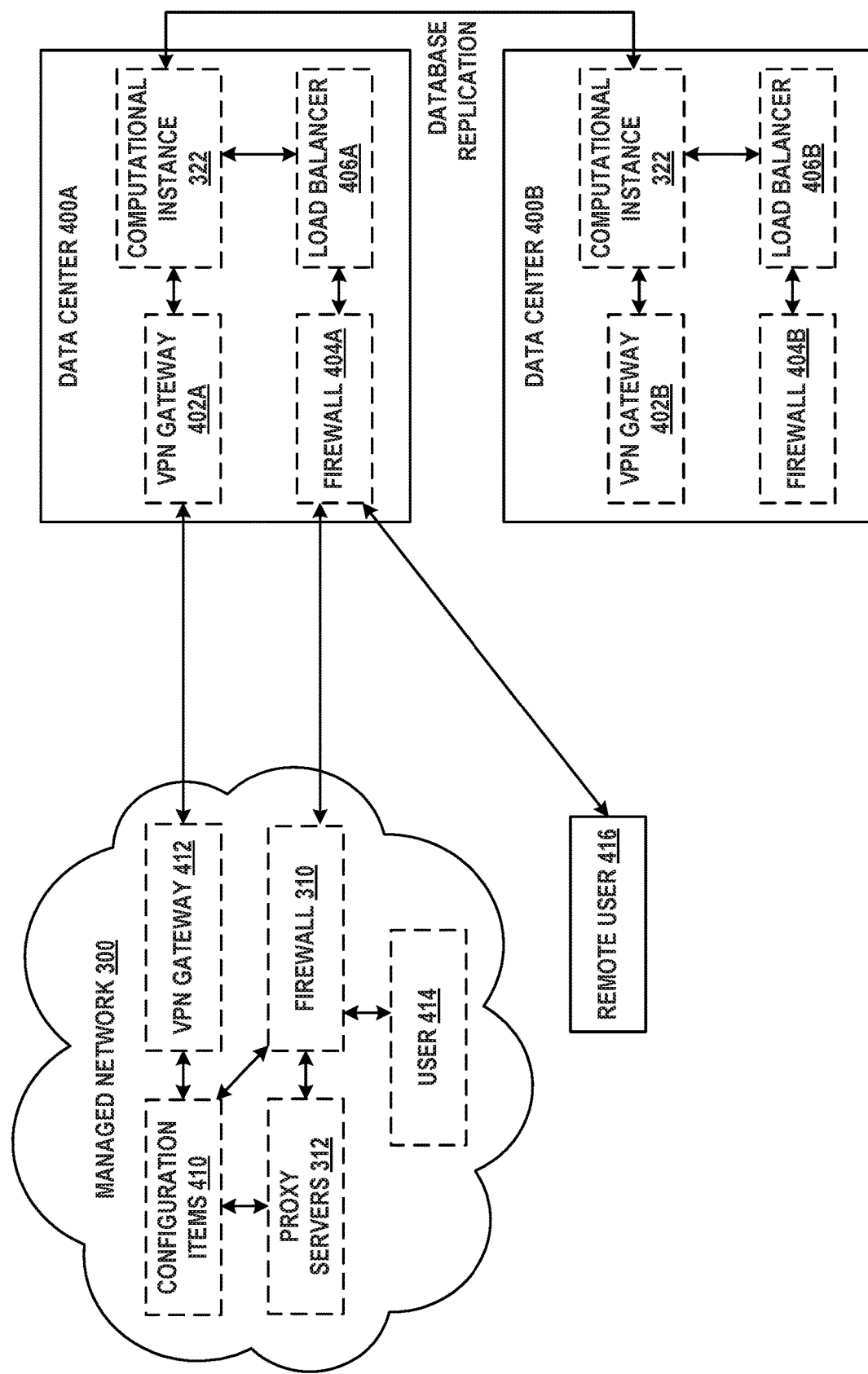
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
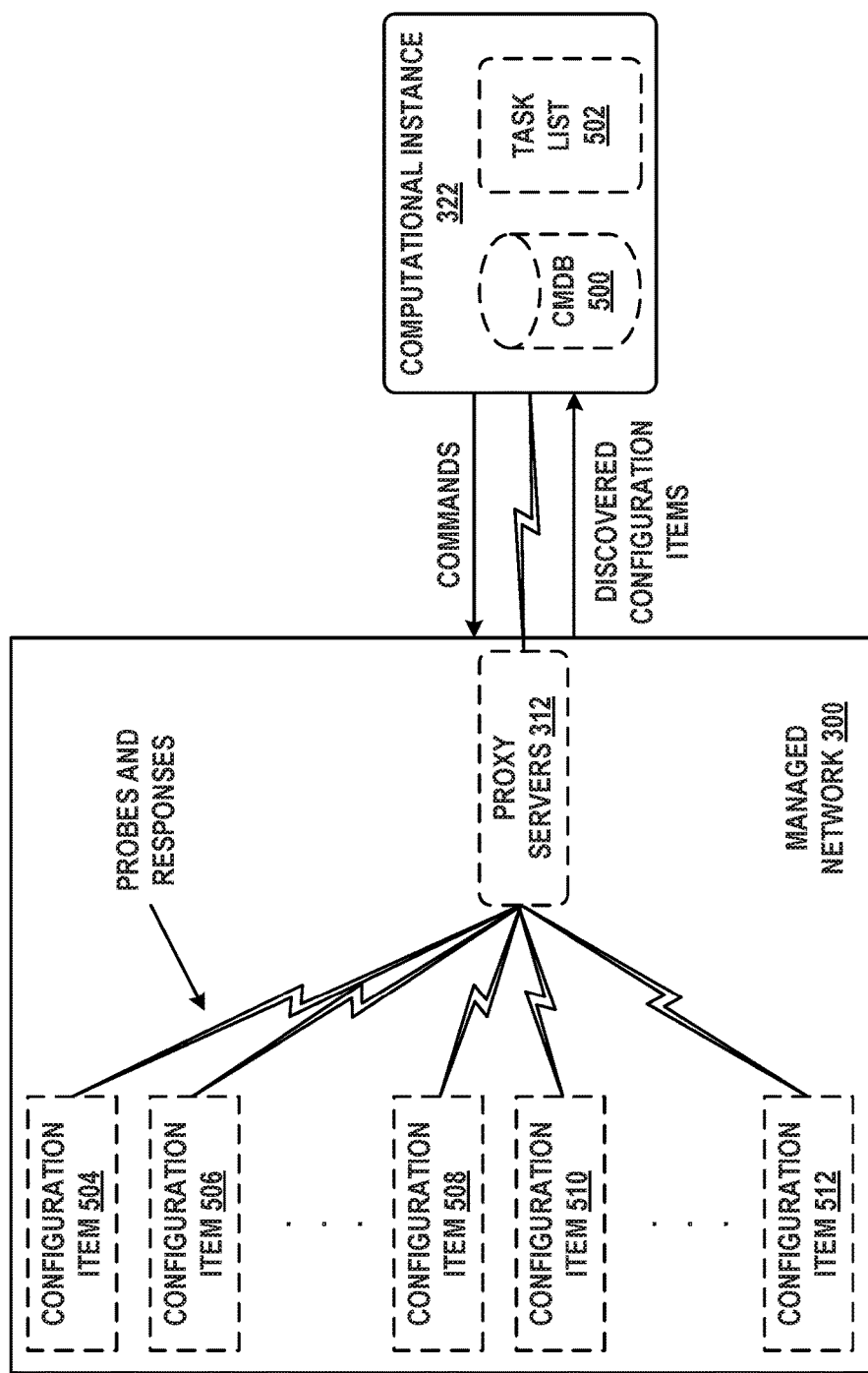
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
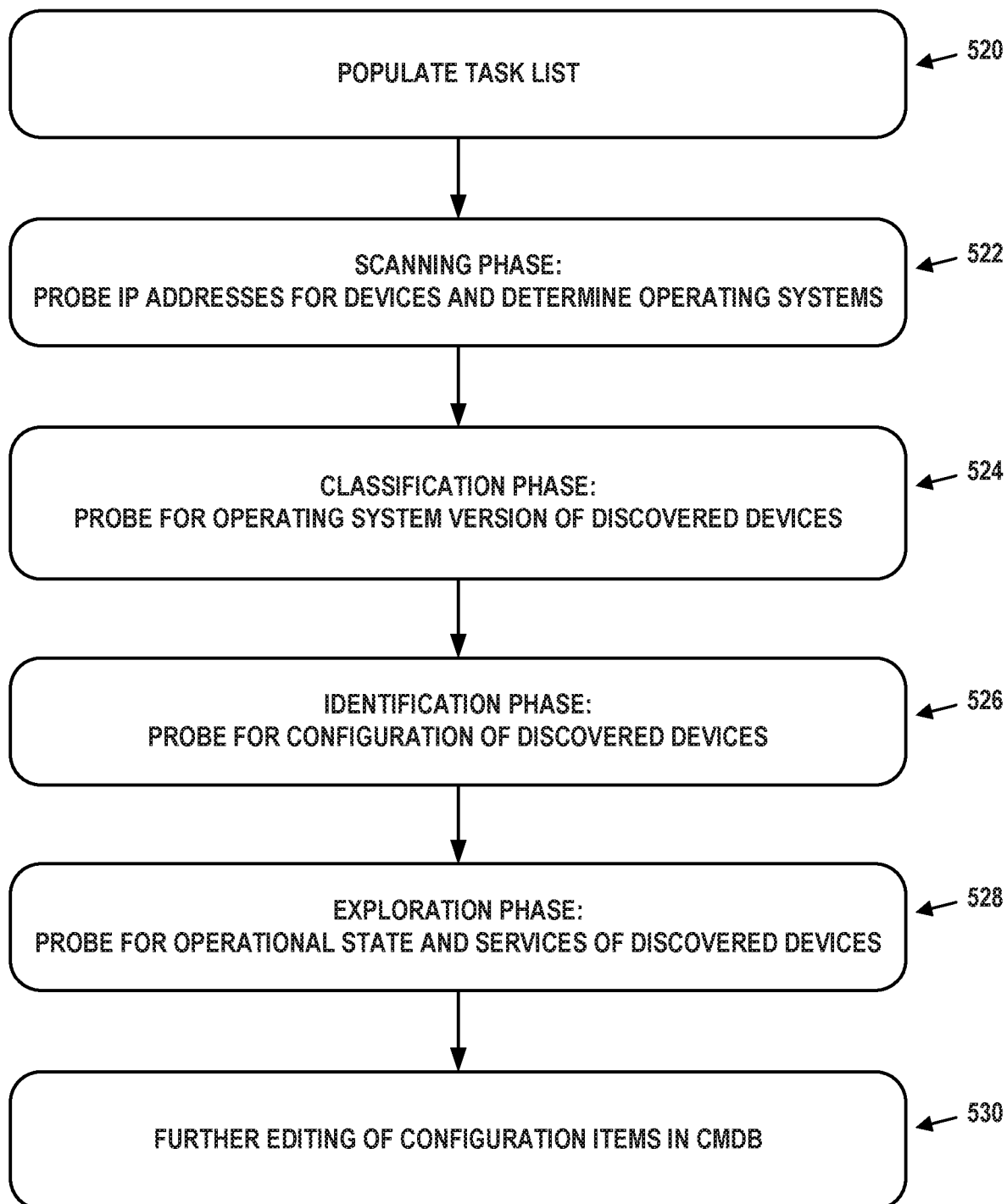
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Automated Test Framework for Web Page Testing

In the context of a web-based application, a testing framework may allow a developer to test the functionality and usability of components on a web page. For example, a testing framework may allow a developer to type a piece of text into an input field from a keyboard, submit the input field as a form, and verify that the submission contains identical text to what was typed. Under a testing framework, these steps may be configured to run automatically to ensure that any changes made during development or after an upgrade have not broken the application.

However, a testing framework may require specific application programing interfaces (APIs) in order to interact with and test components on the page. Such a framework may generally have a predefined expectation of the structure of a web page under test and may be difficult to configure without prior knowledge of web technology, such as HTML, JavaScript, or other languages for representing web pages. Example embodiments herein describe techniques for an automated test framework (ATF) that identifies, from an underlying representation of a web page, elements that are otherwise not accessible for testing via a client API, and presents a user interface for testing these elements. While some user-facing interfaces may be capable of consuming such non-accessible elements, they lack a testing API. More particularly, example embodiments of an ATF may compensate for an absence of test APIs in web pages that may have been developed in an environment where such the APIs are unavailable. By identifying "testable" elements and components of a web page, the ATF may enable an end user interested or tasked with testing to be made aware of the testable elements, select one or more of them, and design and execute a test that exercises and validates the selected testable elements and components.

Such an ATF may be used by web developers for testing and verification during development. It may also be used by a testing "team" or group responsible for testing and validating new and/or upgraded web pages prior to release within an organization. Other use cases and personnel roles for which example embodiments of an ATF may prove advantageous are possible as well.

Figure 6:
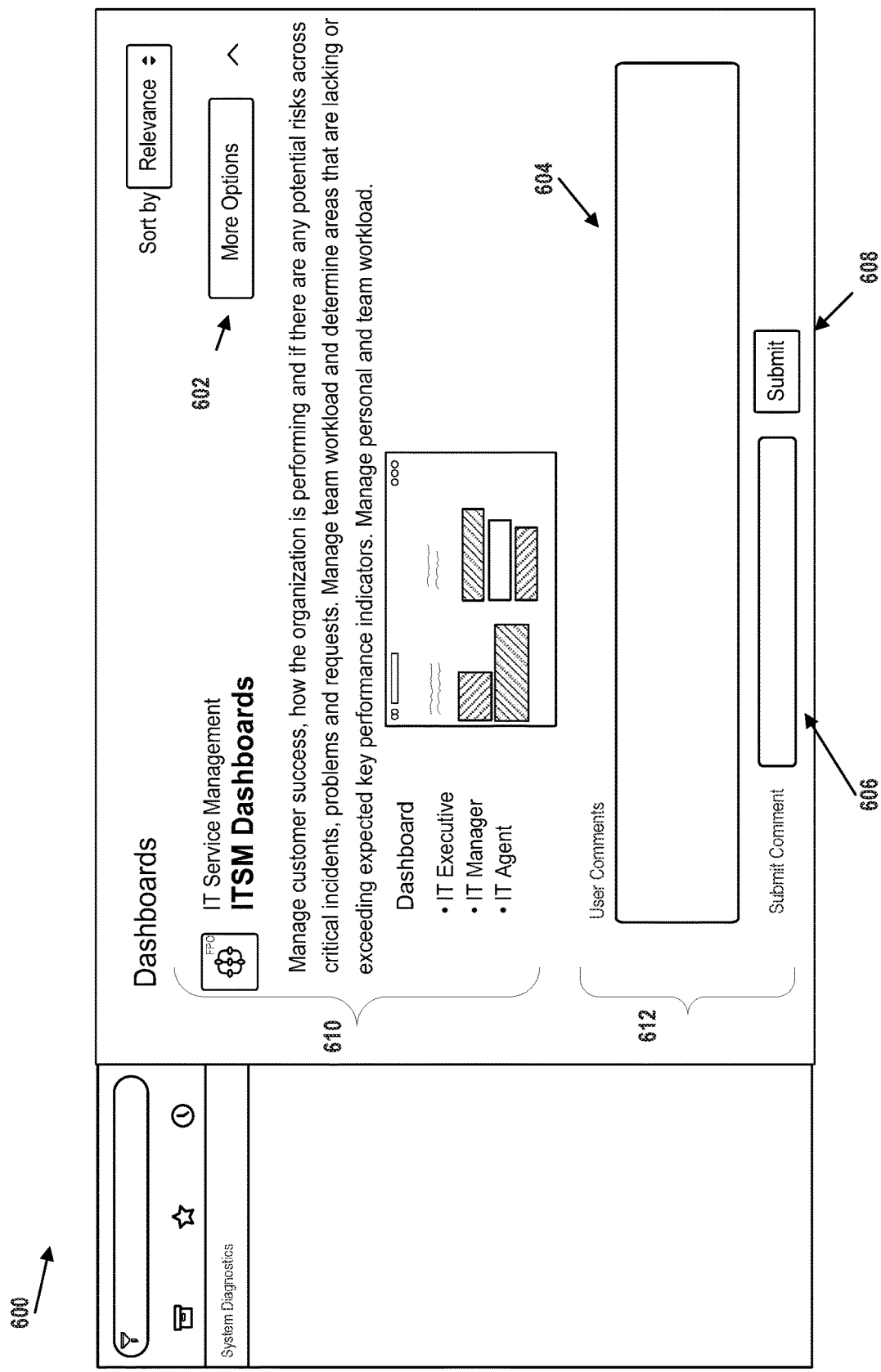
FIG. 6 depicts an example web page, in accordance with example embodiments.

FIG. 6 illustrates an example of a customizable web page 600 that may not have a client API for testing. By way of example, web page 600 is shown to include a number of components that a developer may want to interact with and test, such as options button 602, user comment form 604, user comment text input 606, and user comment submission button 608. There could be other examples of testable components, as well. For example, depending on user requirements, other types of components may be present on web page 600. Web page 600 is also shown to include two subsections 610 and 612. These subsections may help a test creator to visually identify the locations of testable components, which may help in the design of more complex tests, as described below.

A web page, such as web page 600, may be defined according to an underlying representation that is interpretable by a computing device in order for the computing device to "render" the web page in displayable form. For example, the computing device may be a client device with a graphical user interface (GUI), and "rendering" may entail displaying the web page in the GUI. Rendering may include visual and audio components of the web page, but may also include executing one or more scripts that carry out, cause, or invoke other actions, such as playing out a display animation or playing out an audio clip or file. Other script-based actions are possible as well. The underlying representation of a web page may be or resemble a textual coding language. Non-limiting examples in HTML and Javascript. Other forms are possible as well. In an example, the GUI could be or support a browser. For the purposes of discussion and by way of example herein, the underlying representation of a web page will be taken to be HTML. It should be understood that when the term "HTML" is used herein to refer to the underlying representation of a web page, it is not meant to be limiting, and that, unless otherwise stated, any other suitable underlying representation of web pages may be used.

In accordance with example embodiments, an ATF may be directed to perform tests on web page 600. The ATF may begin by loading web page 600 such that it is rendered in a browser, or such that the ATF interacts with the web page 600 as if were being rendered. For example, in some instances, executable actions of rendering may be carried out by a computing device that lacks an actual physical display device, but that nevertheless renders the web page as if a display device were present. The ATF may then analyze the underlying representation of the web page 600, in order to recognize and extract components that available for testing.

The process of analyzing the underlying web page representation may involve textually traversing the web page in an action akin to "crawling" the HTML or other representational form. Thus, for purposes of the discussion herein, the term "crawling" will be used to describe the web page analysis process. In example embodiments, crawling a web page may entail analyzing and/or parsing the underlying representation looking for actionable elements that define or are associated with interactive features or operations in a rendered version of the web page. Non-limiting examples of such actionable elements include clickable buttons, "settable" or editable character fields (e.g., textual and/or numeric input fields), and "gettable" fields, (e.g., textual or numeric that may be retrieved via a cursor or the like). Others may be possible as well.

The underlying representation of a web page may typically include a variety of elements and components that are not associated with interactive functions or operations, or other forms of actionable content. In addition, there may be actionable content of a web page that a tester (e.g., end user) may want to exclude from testing. Thus, in accordance with example embodiments, the crawling operation may provide for limits or controls that cause it to ignore or exclude certain types of actionable content that might otherwise be recognized and identified. The crawler may further be configurable to specifically recognize particular actionable components that might otherwise be left out of a list of recognized, testable items.

More particularly, the page crawler may be configured to traverse the HTML structure and extract each HTML element as defined by an HTML tag. The page crawler may be limited to only identify HTML elements that are in a predefined list of supported HTML element attributes and values. In some embodiments, the page crawler may be configured to filter out specified blacklisted HTML tags or may filter out HTML tags with text values that contain malicious content (e.g. Cross Site Scripting Attacks or Injection Attacks). In other embodiments, the page crawler may be configured to record a hash of the web page in memory, check the hash against a previous hash to see if any content on the page changed, and rerun the page crawler if the hashes don't match (which signifies that new content has been added). Further, the page crawler may ignore or trim redundant or irrelevant HTML tags, even if they are not necessarily blacklisted or deemed dangerous. Additional optimizations to the page crawler may also be used.

In accordance with example embodiments, the results of the crawling operation—namely, identification of actionable or testable components of a web page—may be stored memory in a file or other suitable data structure using a representation that may be different from the underlying representation of the web page. In an example embodiment, the results of the crawler may be stored in a Javascript object notation (JSON) file, although other representational formats may be used.

FIG. 7 shows an example JSON file 700 from results of crawling web page 600. JSON file 700 may contain a single array with each testable component represented as a separate JSON object in the array. Each testable component may be described by grouping of attributes. For example, a component could be described by an HTML tag identifying the component's HTML element, a list of valid methods that a test may use on the component, the area of the web page the component is locate, the HTML identifier (ID) of the component, an index representing whether there is more than one of the component, the inner text description displayed on the HTML element, and a hash. Other descriptors may be used as well. In the example illustrated, JSON file 700 contains representations of components from web page 600, namely options button 602, which is described to be located in area 610, and user comment form 604, user comment text input 606 on web page 600, and user comment submission button 608, which are described to be located in area 612 on web page 600. As the number of distinct components grows on a web page, a user of the ATF may use these component descriptions to distinguish between various web page components when creating tests.

In determining the ways that a test may interact with a component, an ATF may group components into distinct classes to define the types of interactions that a test creator may use on a component. These classes may include a gettable class for components with values or states that can be read during a test, a clickable class for components with elements that can be clicked via a UI, and settable class for components with elements that have input values. More custom classes may also be added to cover components that fall under multiple classes or to cover components with complex UI interaction, such as certain types of dropdown menus and/or directives. Non-limiting examples may include a "jQuery <select2>" dropdown menu and an "angular" directive. When displaying testing options to a test creator, an ATF may then use these classes to inform how a test may be created.

Figure 8A:
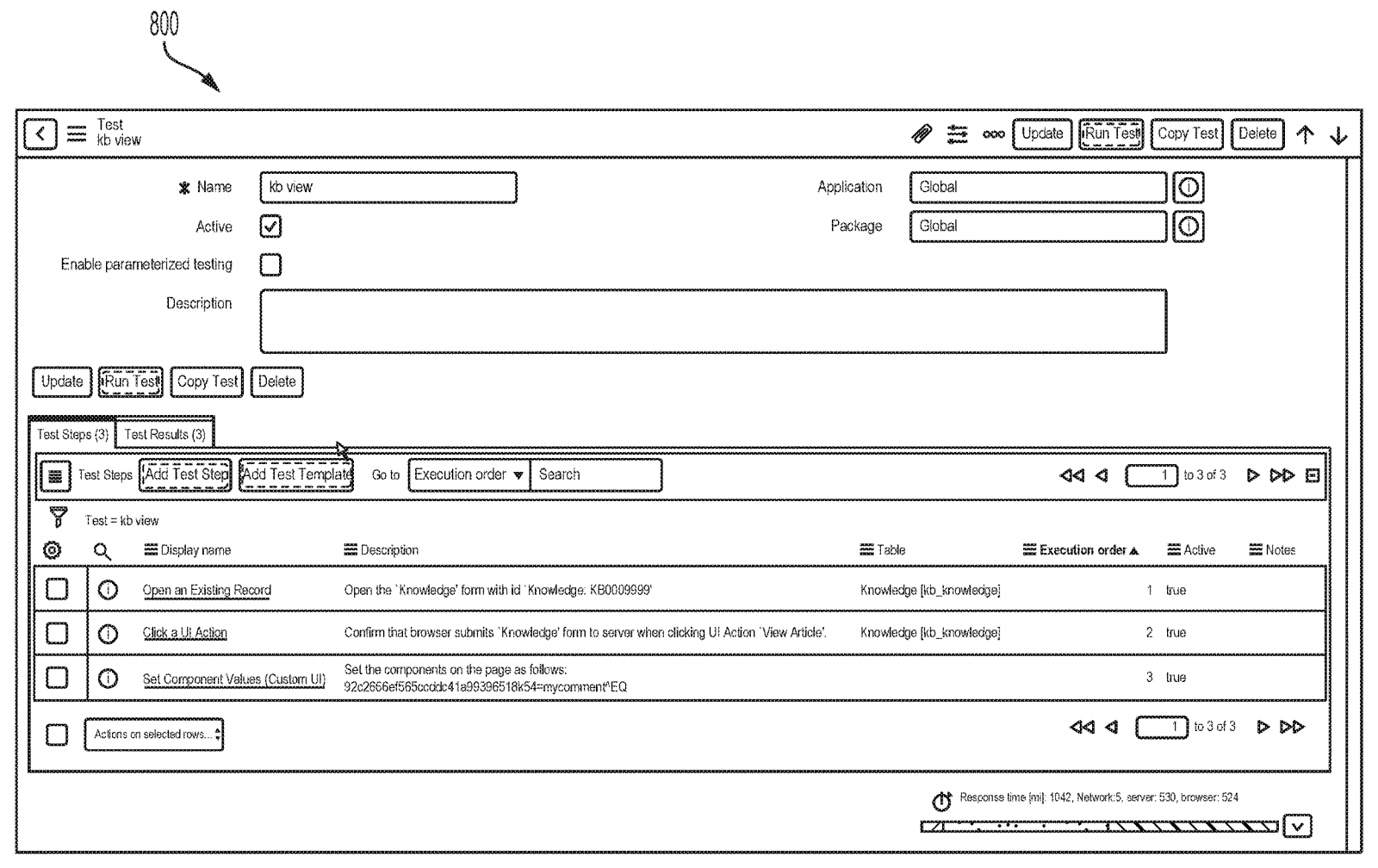

After page crawler determines testable components on the page, and they are stored in a JSON file (or other suitable representation), a test creator may want to configure a test. This procedure is illustrated in FIG. 8A. In this example, a test GUI 800 is displayed to allow a test creator to configure a test without necessarily having to understand any underlying code structure of a web page. In some embodiments, test GUI 800 may provide a test creator with the ability to add test steps. Each test step may be a single interaction between the ATF and a component. For example, a first test step may be to click a component button on a web page that displays a pop up window. In another example, a second test step to the first test step above may be to validate that a pop up window has appeared. Test GUI 800 may allow test creators to specify the ordering of these test steps so that they execute sequentially. With distinct steps, an ATF can test how components interact with each other in production.

Figure 8B:
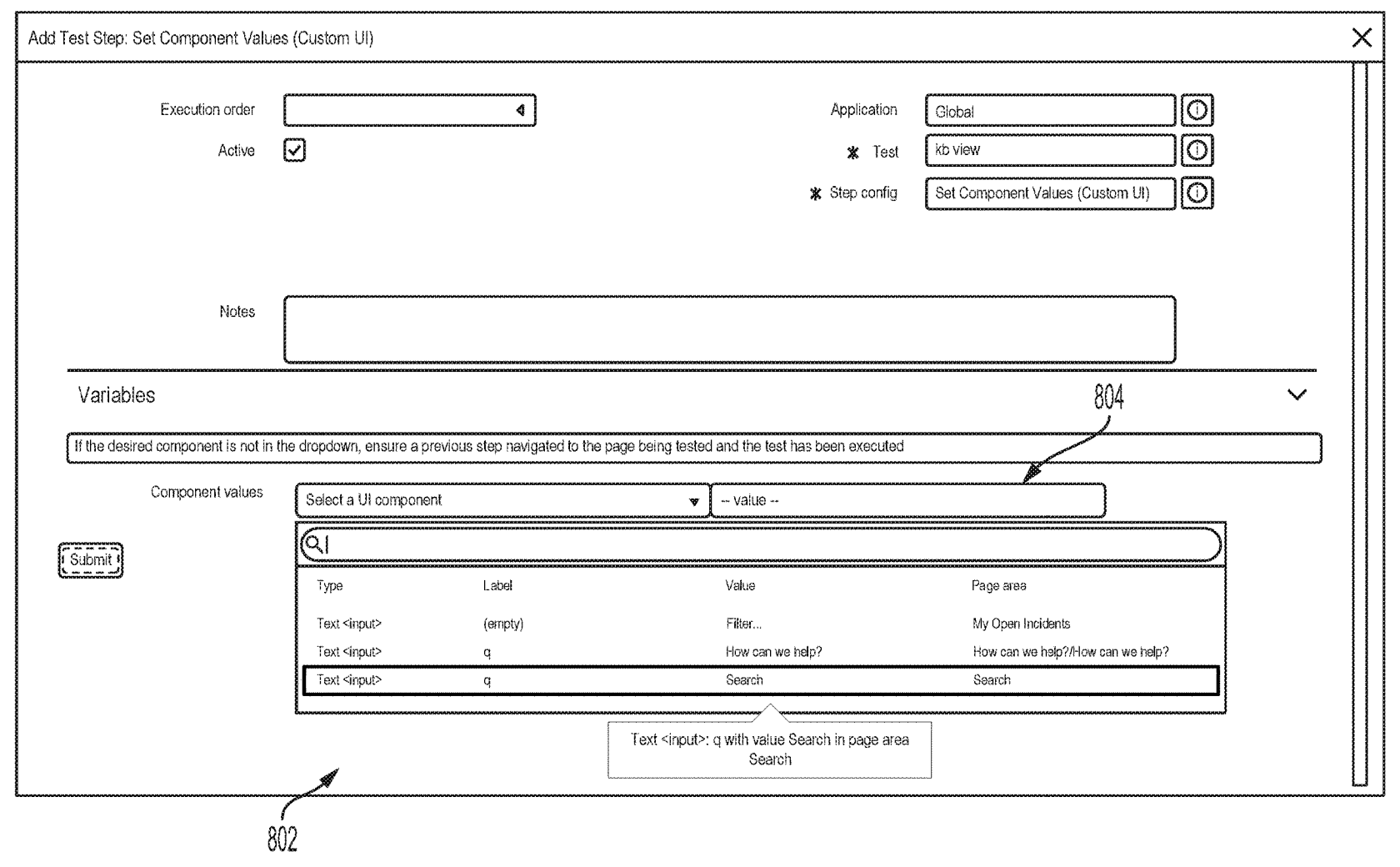

FIG. 8B illustrates how a single test step can be added. In the present embodiments, JSON file 700 may be rendered and displayed to a test creator via dropdown menu or list 802, thus allowing a test creator to view all testable components on a web page. Each available component in dropdown 802 may be described by a plurality of columns, which correspond to JSON attributes in JSON file 700, to allow test creators to correctly identify the specific web page components for the test. Thus, instead of manipulating a test framework, the test creator can read the column descriptions that directly correspond to HTML elements displayed on the web page. Once a specific component from dropdown 802 is selected, a test creator may input a value 804 to populate the component during the test. In some embodiments, a single test step may be configured to receive output values from a previous test steps or prepopulate input values for components based on the HTML text that the component already contains in the original web page 600.

Figure 8C:
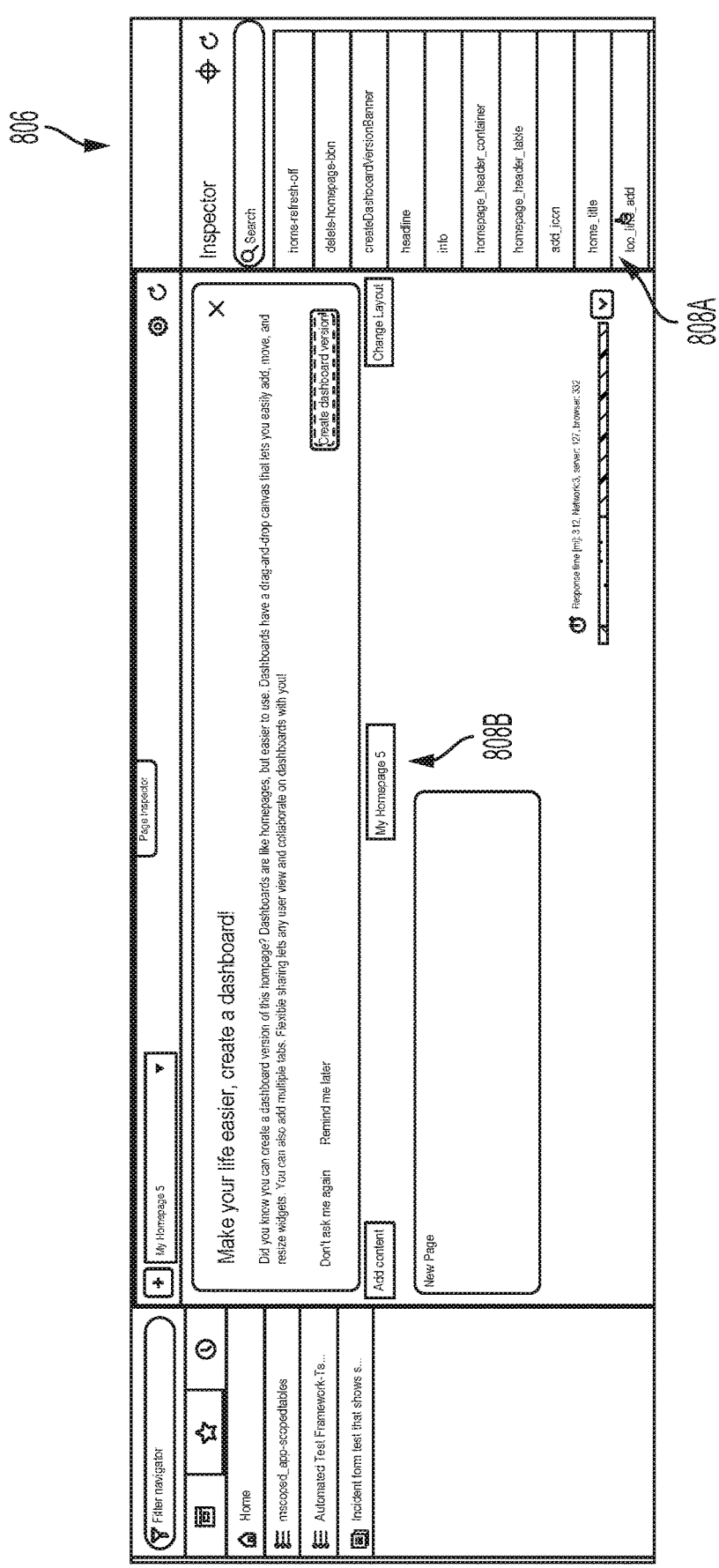
FIG. 8C depicts still another version of an example graphical user interface (GUI) for test development, in accordance with example embodiments.

FIG. 8C next illustrates a page inspector that may provide a test creator with a visual representation as to how each of the testable components map to elements on the web page. In the presents embodiments, a page inspector may include a listing 806 of all testable components recorded in JSON file 700. When browsing through these components, a test creator may click on component 808A and immediately see a visual indicator 808B on the web page that represents the testable component. Thus, a page inspector may assist in the creation of tests. FIGS. 8B and 8C are illustrative of how a page inspector may help a page author confirm that a page is testable in real time, while the page is being authored. This is done by interacting with page components through the API. In particular, the page inspector provides capabilities to call functions including, but not limited to, set, get, and isEditable, and thereby allow a page author to see expected behavior in real time.

After creating test steps, the ATF may provide a test creator with options for immediately executing the test according to the steps, and/or for storing the test for later execution. In an example embodiment, the ATF may store the test information into a database. Once stored in a database, tests may be run manually by a test creator, scheduled to run at specific times or intervals, or grouped into larger test batches to be run simultaneously with other tests. In some embodiments, a test may include steps that involve UI elements and can run those steps in a separate browser window on a test client.

Figure 9:
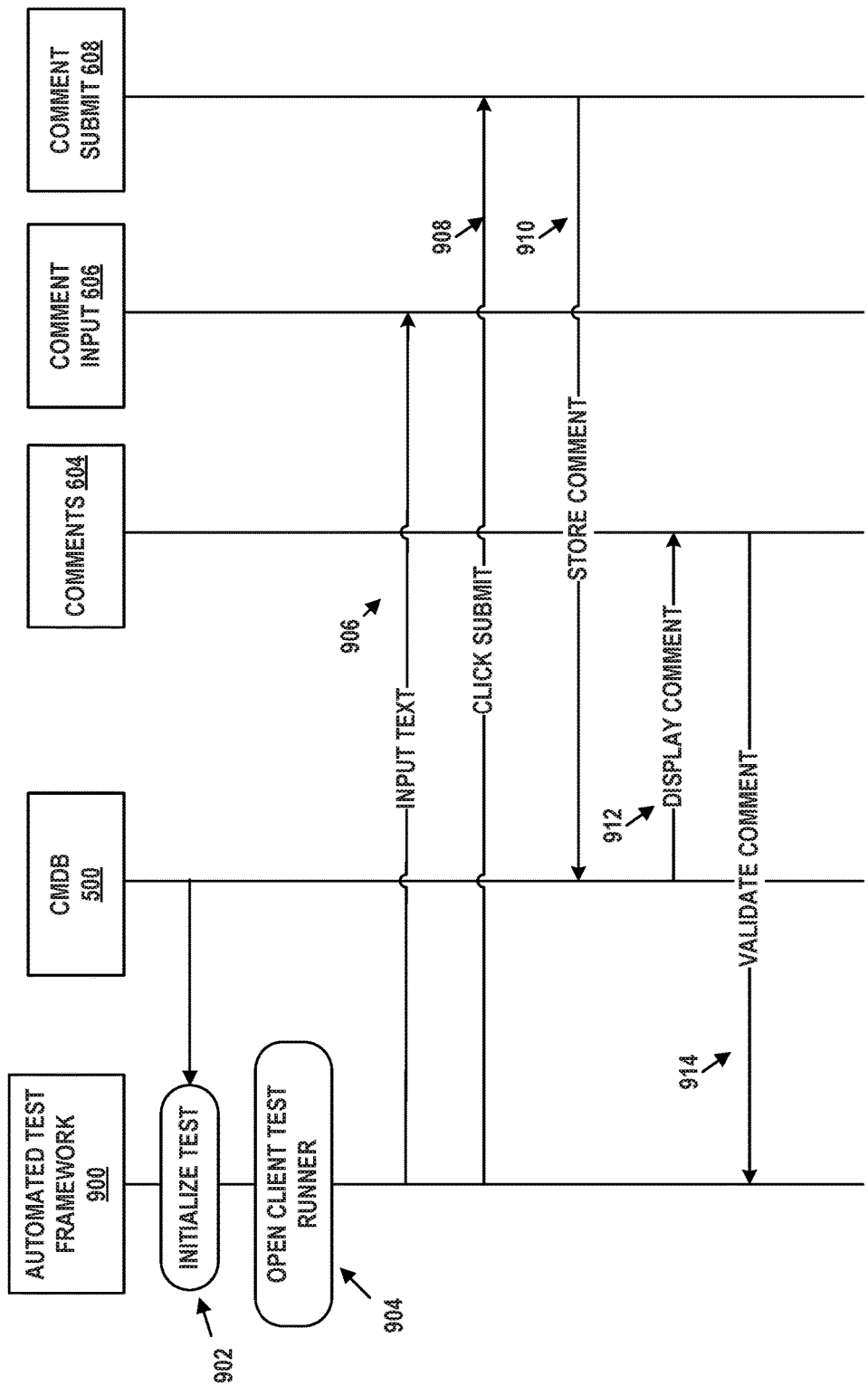
FIG. 9 depicts an example sequence of operations involved in automated testing, in accordance with example embodiments.

An example of test execution is illustrated in FIG. 9, which shows execution of an ATF 900 in a client device. In step 902, the test is initialized into ATF 900 from database 500. In step 904, the ATF detects that the test involves UI elements and opens a client test runner on a client browser. In step 906, the test inputs a portion of predefined text into user comment text input 606 as shown above in web page 600. In step 908, the test clicks user comment submission button 608. This triggers step 910, which stores the comment into database 500. In step 912, web page 600 detects a new comment and renders the comment into the user comment form 604. In step 914, the test monitors user comment form 604 and validates that the added comment contains the same text as inputted in step 906. After running a test, a test results record may be stored in a database containing the details on test errors and suggestions for troubleshooting any test problems.

In some instances, a customer of a service provider or vendor of a remote network management platform may run a single web page in multiple environments for development, testing, and production of the web page. In some embodiments, the ATF may contain a rollback engine designed to record all changes to web page in a given environment while running a test and revert all changes so that a web page in a given environment may return to a pre-test state. For example, if a test resulted in the creation of 50 comments, the rollback engine may be configured to detect the comments and delete them once test is complete. Thus, the integrity of a web page can be protected via a rollback engine.

VI. Example Operations

Figure 10:
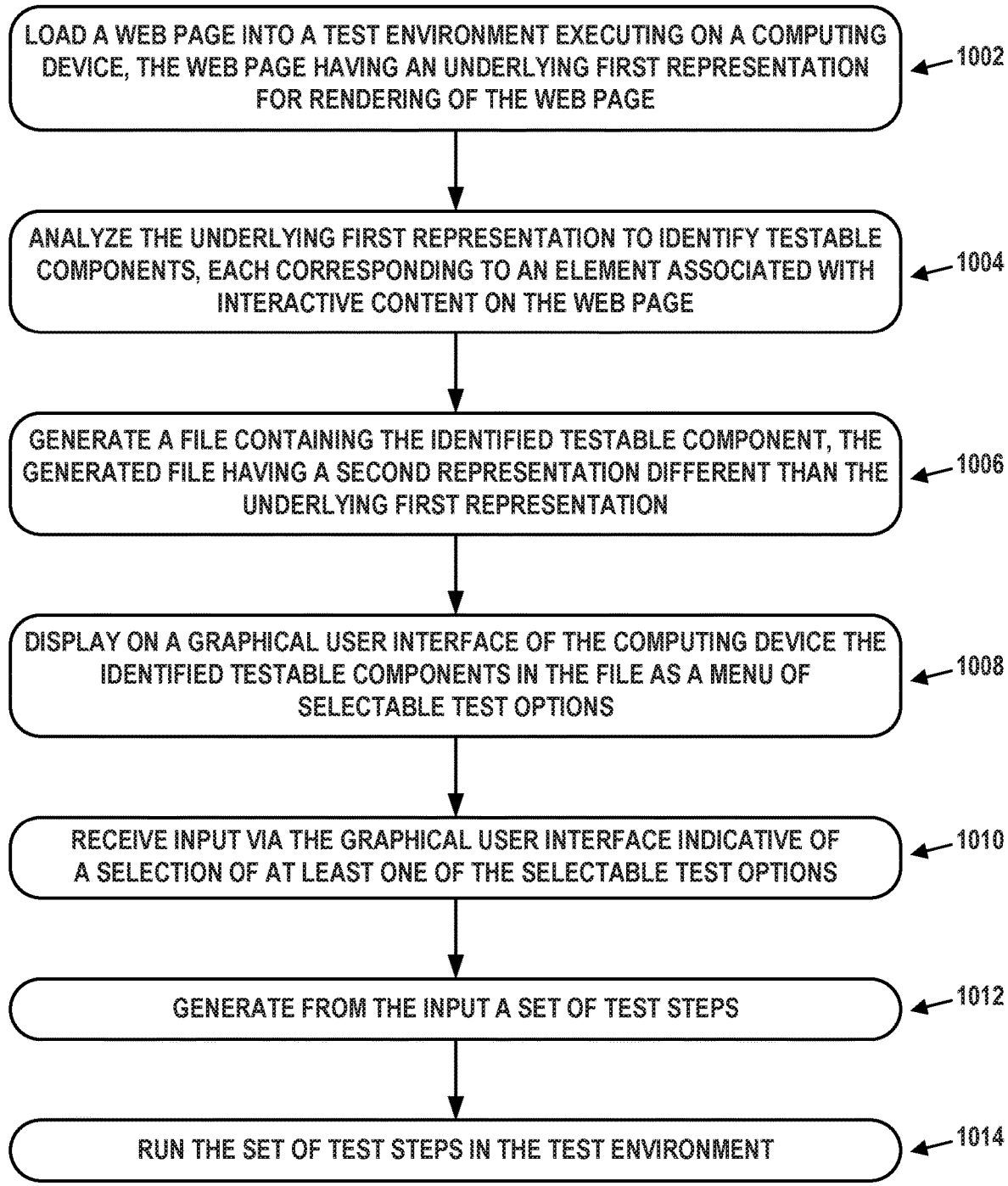
FIG. 10 is a flow chart illustrating an example method, in accordance with example embodiments.

FIG. 10 is a flow chart illustrating an example embodiment. The process illustrated by FIG. 10 may be carried out by a computing device, such as computing device 100, and/or client device 302, for example. However, the process can be carried out by other types of devices or device subsystems. For example, the process could be carried out by a portable computer, such as a laptop or a tablet device.

The computing device may include a processor, a display component, such as a monitor screen, and program memory for storing computer-readable instructions that, when executed by processor, cause the computing device to carry out the various steps of the example method, which are described below. The computer-readable instructions may also be stored on a non-transitory computer-readable medium.

The embodiments of FIG. 10 may be simplified by the removal of any one or more of the features shown therein. Further, these embodiments may be combined with features, aspects, and/or implementations of any of the previous figures or otherwise described herein.

Block 1002 may involve loading a web page into a test environment executing on the computing device, the web page having an underlying first representation for rendering of the web page.

Block 1004 may involve analyzing the underlying first representation to identify testable components, each corresponding to an element associated with interactive content on the web page. For example, a testable component may be at least one of a clickable component (such as a graphical button or link), a settable component (such as a variable or text field), or a gettable component (such as a variable or text).

Block 1006 may involve generating a file containing the identified testable component, the generated file having a second representation different than the underlying first representation.

Block 1008 may involve displaying in a graphical user interface of the computing device the identified testable components in the file as a menu of selectable test options.

Block 1010 may involve receiving input via the graphical user interface indicative of a selection of at least one of the selectable test options.

Block 1012 may involve generating a set of test steps from the input.

Finally, block 1014 may involve running the set of test steps in the test environment.

In accordance with example embodiments, the example method may further entail displaying results of running the set of test steps in the test environment. In addition, the example method may also involve storing the generated set of test steps in a database for later retrieval and running of the set of test steps.

In accordance with example embodiments, analyzing the underlying first representation may entail textually crawling the underlying first representation to identify pre-defined tags and/or labels. Further, analyzing or crawling the underlying first representation may entail ignoring certain testable components identified in a pre-defined list of excluded testable components. For example, an embodiment may provide for a blacklist that identifies potential testable components that should be ignored in the crawling process.

In accordance with example embodiments, the second representation may be more abbreviated or streamlined that the first underlying representation, such that it contains less information than the underlying first representation. In an example embodiment, the first underlying representation may be HTML, and the second may be JSON. Other representations are possible as well.

In further accordance with example embodiments, the example method may further entail reversing any changes to the test environment and/or the loaded web page made as a result of running the set of test steps in the test environment. For example, the ATF may create a log of all instructions carried out and changes made in the course of creating and running a test. The log file may then be used to "rewind" the test environment and/or web page once the testing is complete. This may then restore the test environment and/or the loaded web page to a state or states of each prior to the start of testing and/or test generation.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing device comprising:
a processor;
a display component; and
memory storing instructions that, when executed by the processor, cause the computing device to carry out operations including:
loading a web page into a test environment, the web page having an underlying first representation for rendering of the web page;
analyzing the underlying first representation to identify testable components, each corresponding to an element associated with interactive content on the web page;
generating a file containing the identified testable components, the generated file having a second representation different than the underlying first representation;
on the display component, displaying, in a graphical user interface, the identified testable components in the generated file as a menu of selectable test options;
generating a test comprising a set of test steps to test the identified testable components, wherein a particular test step of the set of test steps is configured by:
receiving, via the graphical user interface, a selection of one of the identified testable components on the menu of selectable test options;
receiving, via the graphical user interface, an input identifying an input value to assign to the selected identified testable component for a portion of the test, wherein the input value assigned to the selected identified testable component comprises an output value obtained from a previous test step of the set of test steps; and determining an order of execution of the particular test step within the set of test steps; and running the set of test steps in the test environment.

2. The computing device of claim 1, wherein the operations include displaying results of running the set of test steps in the test environment.

3. The computing device of claim 1, wherein the operations include storing the generated test in a database.

4. The computing device of claim 3, wherein the operations include:

retrieving the stored test from the database; and running the retrieved test in the test environment.

5. The computing device of claim 1, wherein analyzing the underlying first representation comprises textually crawling the underlying first representation to identify pre-defined tags and/or labels.

6. The computing device of claim 1, wherein analyzing the underlying first representation comprises ignoring testable components identified in a pre-defined list of excluded testable components.

7. The computing device of claim 1, wherein the second representation contains less information than the underlying first representation.

8. The computing device of claim 1, wherein each testable component comprises at least one of a clickable component, a settable component, or a gettable component.

9. The computing device of claim 1, wherein the underlying first representation is hypertext markup language (HTML).

10. The computing device of claim 1, wherein the second representation is Javascript object notation (JSON).

11. The computing device of claim 1, wherein the operations include reversing any changes to the test environment or the loaded web page, or a combination thereof, made as a result of running the set of test steps in the test environment.

12. A method carried out in a computing device, the method comprising:

loading a web page into a test environment executing on the computing device, the web page having an underlying first representation for rendering of the web page;

analyzing the underlying first representation to identify testable components, each corresponding to an element associated with interactive content on the web page;

generating a file containing the identified testable components, the generated file having a second representation different than the underlying first representation;

displaying, in a graphical user interface of the computing device, the identified testable components in the generated file as a menu of selectable test options;

generating a test comprising a set of test steps to test the identified testable components, wherein a particular test step of the set of test steps is configured by:

receiving, via the graphical user interface, a selection of one of the identified testable components on the menu of selectable test options;

receiving, via the graphical user interface, an input identifying an input value to assign to the selected identified testable component for a portion of the test, wherein the input value assigned to the selected identified testable component comprises an output value obtained from a previous test step of the set of test steps, and determining an order of execution of the particular test step within the set of test steps; and running the set of test steps in the test environment.

13. The method of claim 12, comprising displaying results of running the set of test steps in the test environment.

14. The method of claim 12, comprising storing the generated test in a database.

15. The method of claim 14, comprising:

retrieving the stored test from the database; and running the retrieved test in the test environment.

16. The method of claim 12, wherein analyzing the underlying first representation comprises textually crawling the underlying first representation to identify pre-defined tags and/or labels.

17. The method of claim 12, wherein analyzing the underlying first representation comprises ignoring testable components identified in a pre-defined list of excluded testable components.

18. The method of claim 12, wherein the second representation contains less information than the underlying first representation.

19. The method of claim 12, wherein each testable component comprises at least one of a clickable component, a settable component, or a gettable component.

20. The method device of claim 12, wherein the underlying first representation is HTML.

21. The method of claim 12, wherein the second representation is JSON.

22. The method of claim 12, comprising reversing any changes to the test environment, the loaded web page, or a combination thereof, made as a result of running the set of test steps in the test environment.

23. An article of manufacture including a non-transitory computer-readable medium, having stored thereon program instructions that, upon execution by a computing device, cause computing device to perform operations comprising:

loading a web page into a test environment executing on the computing device, the web page having an underlying first representation for rendering of the web page;

analyzing the underlying first representation to identify testable components, each corresponding to an element associated with interactive content on the web page;

generating a file containing the identified testable components, the generated file having a second representation different than the underlying first representation;

displaying, in a graphical user interface of the computing device, the identified testable components in the generated file as a menu of selectable test options;

generating a test comprising a set of test steps to test the identified testable components, wherein a particular test step of the set of test steps is configured by:

receiving, via the graphical user interface, a selection of one of the identified testable components on the menu of selectable test options;

receiving, via the graphical user interface, an input identifying an input value to assign to the selected identified testable component for a portion of the test, wherein the input value assigned to the selected identified testable component comprises an output value obtained from a previous test step of the set of test steps; and determining an order of execution of the particular test step within the set of test steps;

running the set of test steps in the test environment.

* * * * *